Figure 1:
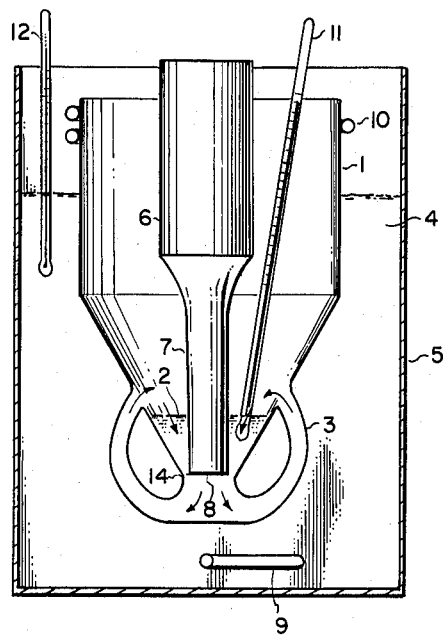

April 19, 1966   E. A. DAVIDSON ETAL   3,246,881
PROCESS AND APPARATUS FOR TREATING HEAT SENSITIVE
MATERIAL WITH SONIC VIBRATIONS
Filed July 16, 1963

INVENTORS
EUGENE A. DAVIDSON
THEODORE ROSETT
BY
ATTORNEY

United States Patent Office 3,246,881
Patented Apr. 19, 1966

3,246,881
PROCESS AND APPARATUS FOR TREATING HEAT SENSITIVE MATERIAL WITH SONIC VIBRATIONS
Eugene A. Davidson and Theodore Rosett, Durham, N.C., assignors, by mesne assignments, to Branson Instruments, Incorporated, Stamford, Conn., a corporation of Delaware
Filed July 16, 1963, Ser. No. 295,315
4 Claims. (Cl. 259—61)

This invention relates to an improved vessel for the ultrasonic rupture of cells, preparation of emulsions, etc.

Ultrasonic energy has been used extensively for treatment of various biological materials usually involving the rupture of cells so that intracellular liquids can be set free and analyzed. Usually a relatively small size of ultrasonic probe is used and theoretically excellent results are obtainable. However, in practice, certain problems have arisen. The ultrasonic vibrations, or in some cases high frequency sonic vibrations, transfer rapid mechanical vibrations to a liquid medium in which the cells are suspended. Unfortunately, the vibrational energy is finally dissipated as heat and after a short period temperatures may rise to a point at which the biological material is damaged and in some extreme cases destroyed. Other systems, such as some emulsions are also heat sensitive. This has seriously interfered with the general use of sonic vibrations for the treatment of biological material.

It is, of course, an obvious procedure to attempt to cool the liquid system to which sonic vibrations are applied. Unfortunately, this has not proved to be a successful solution. The sonic vibrations are normally confined to a very small area in the liquid and so the heat is generated locally, whereas cooling of the outer walls of the vessel often will not remove heat from a central location with sufficient rapidity to prevent damage of the biological material by local overheating.

The present invention combines a conventional sonic probe with a particular shape or design of vessel which cooperates with the probe to eliminate the problems presented by local superheating without the addition of any further elements. The vessel is of course cooled by immersing it in a cold bath which may be ice water, or salt and ice if still lower temperatures are desired. Essentially the present invention provides a vessel with side arms located with respect to the position of the sonic probe so that the vibrations thereof induce a current of the suspension of biological material which flows through the side arms, is very rapidly cooled, since the side arms have a relatively large surface exposed to cooling bath in comparison to their volume, and returned to the main part of the vessel. Liquid medium is thus continuously and rapidly removed from the zone of sonic vibrations and does not have a chance to heat up to temperatures which would cause problems of degradation or destruction of the cells. The current flows through the side arms, is intensely cooled and is brought back so that the sonic probe at all times is working on a liquid which is relatively quite cold and which liquid does not remain within the zone of intense sonic vibration for a sufficient period of time to heat up.

Figure 2:
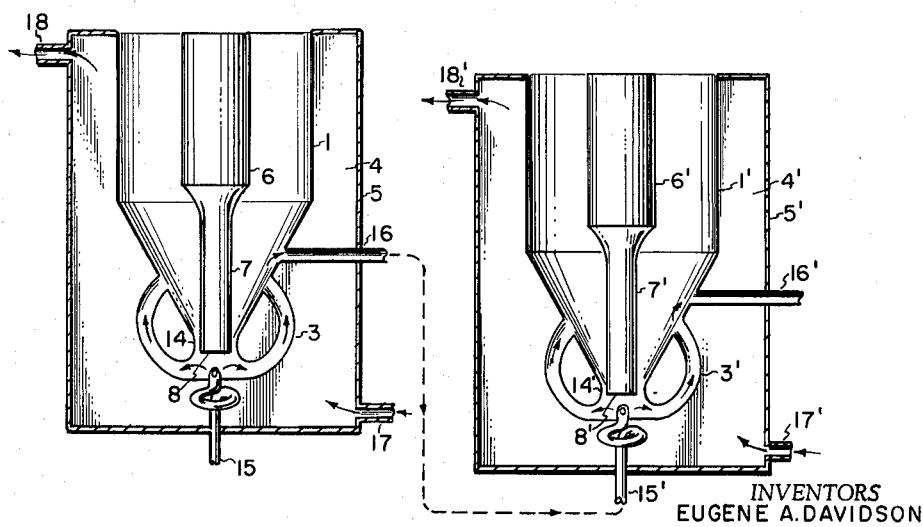

The invention will be described in greater detail in conjunction with the drawings in which:

FIG. 1 is a section through batch apparatus, and
FIG. 2 is a section through multiple continuous apparatus.

The operation of the process of the invention will first be described in conjunction with the simple batch apparatus shown in FIG. 1. A vessel 1 contains a suspension of biological material or a mixture of heat sensitive materials 2. It is provided with side arms 3 which communicate both at a high point and with the narrowed bottom 14 of the vessel which may advantageously be of conical cross-section. The number of side arms is not important, three being a suitable number. The drawings show two of these three arms.

The container and the arms are immersed in a cooling bath 4 which may be ice water or salt and ice which is contained in a vessel 5. A sonic probe 6 of known design is provided with an acoustic transformer 7 to amplify the excursions of the tip 8. The probe is shown diagrammatically as the present invention can use any suitable design. However, the end of the probe must be of a size to fit in the conical bottom section of the vessel 1 sufficiently near to the walls so that the net forward sonic pressure will produce a current flowing down through the conical section.

The heat sensitive liquid 2, for example a suspension of biological material which is to be subjected to sonic vibrations, is filled into the container 1 to a level which is preferably below the top of the side arms 3. The probe may be hand held or clamped in a clamp 10 as illustrated in the drawings.

The power is then turned on and the vibrations of the tip 8 cause a rapid flow downwardly and then up through the side arms 3 where the liquid is cooled by the external cooling bath. The sonic probe is thus acting both as a transducer to impart sonic vibrations to the liquid and as a pump.

The cooling bath will normally be of sufficient volume so that its temperature does not greatly change. However, if it is desired to assure the maximum of uniformity stirring can be used and is shown diagrammatically as a stirrer 9.

The present invention is primarily a process or organization of apparatus rather than any particular detailed design. Thus for example, exact shape of the side arms or the rest of the container 1 is more or less immaterial so long as they are dimensioned suitably with respect to the sonic probe so that the fluid circulation is produced.

The container 1 may be of any suitable material such as stainless steel, glass and the like. It should be noted that in the case of glass the heat transfer through the walls of the side arms will be decreased and it may be necessary to utilize a colder bath 4 surrounding the arms. However, since the walls are fairly thin, even with a mediocre heat conductor, such as glass, rapid cooling takes place and no particular problems are presented. In operation it is desirable to check the temperature of the cooling bath and in the container 1 and this is shown diagrammatically as effected by thermometers 11 and 12. The thermometers have nothing to do with the operation and merely are useful adjuncts in order to determine the temperature at which the cooling bath is to be maintained in order to assure a sufficiently low temperature at the point where the sonic vibrations are applied to the liquid in the container 1.

A batch device is illustrated in FIG. 1 and for many laboratory purposes this presents advantages and is a cheap construction. FIG. 2, however, illustrates a continuous process. The containers and probes are duplicated, the first container bearing the same reference numerals as in FIG. 1 and the second container bearing primed reference numerals.

Material to be subjected to vibration is introduced by the pipe 15, provided with a strain loop, near the end of the probe and material which has been subjected to vibration is continuously drawn off, through the pipe 16.

It is possible to use one piece of apparatus but the time during which the material is subjected to sonic vibrations in a single pass may be too short and multiple units may be used in series. This is shown in FIG. 2 where the outflow from tube 16 is introduced into the second unit of the figure through the inlet pipe 15' and the outlet from this second unit is through the outlet pipe 16'. Because of the greater capacity of the continuous unit a continuous flow of coolant is provided to containers 5 and 5' through inlet pipes 17 and 17' and outlet pipes 18 and 18'. It is, of course, possible to use more than two units in series but for many purposes it will be found that two are quite adequate. Since the process is continuous, a much larger production is obtainable from units of a given size. This is particularly important in processes where the heat sensitive material is produced in large volume, for example emulsions. The rupture of cells in biological material normally occurs in smaller volume and for this type of material the batch process is often preferable.

The heat sensitive materials which have been described above are biological material and liquids which are to be emulsified. These two types of materials constitute the most important fields of utility of the invention at the present time. However, it should be understood that the invention is not limited to them and may be used to form dispersions of solids in liquids. Of course, multiphase systems may also be involved with finely divided solids and an emulsion of two or more liquid constituents. Except for the particular usefulness of the present invention in the treatment of heat sensitive material is not particularly concerned with the physical or chemical nature of the material and it is an advantage that the invention is, therefore, useful with a wide range of materials, particularly heat sensitive materials, which are to treated with sonic vibrations.

We claim:
1. An apparatus for the treatment of heat sensitive material by sonic vibrations, comprising,
   (a) a container having a restricted bottom section adapted to receive a sonic probe closely adjacent to the wall of the restricted section,
   (b) side conduits communicating with the bottom section of the container and with a higher level thereof to permit circulation of the material treated through the side conduits and back onto the main body of the container, said conduits having a ratio of surface in comparison to their volume greatly in excess of the ratio between surface and volume of the container,
   (c) a sonic probe extending into the restricted bottom section of the container, said probe being capable of producing longitudinal sonic vibrations,
   (d) the probe being located in the restricted portion of the container sufficiently close to the walls thereof that when vibrating longitudinally it will pump liquid out of the bottom of the container and back through the side conduits, and
   (e) external cooling means in heat exchanging relation with said side conduits, whereby liquid pumped through the conduits is cooled down before succeeding contacts with the sonic probe.

2. A process of treating heat sensitive material by sonic vibrations which comprises,
   (a) establishing a treatment zone in the form of liquid material,
   (b) applying longitudinal sonic vibrations thereto in a direction to produce a current of liquid,
   (c) causing the liquid to flow back up into the treatment zone through an external zone, the flow through the external zone being caused, at least in part, by the current of liquid produced by the sonic vibrations, and,
   (d) subjecting said external zone to heat exchange with a coolant whereby the average temperature in the zone subjected to the said sonic vibrations is maintained at a temperature at which the material is not adversely affected.

3. A process according to claim 2 in which the heat sensitive material comprises an aqueous suspension of biological material.

4. A process according to claim 2 in which the material to be treated by sonic vibrations comprises a mixture of emulsifiable liquids.

References Cited by the Examiner

UNITED STATES PATENTS

| | | | |
|---|---|---|---|
| 1,810,637 | 6/1931 | Beers | 165—108 |
| 2,238,130 | 4/1941 | Paulus | 165—109 |
| 3,154,890 | 11/1964 | Lemelson | 15—321 X |

WILLIAM I. PRICE, *Primary Examiner.*

WALTER A. SCHEEL, *Examiner.*

ROBERT W. JENKINS, *Assistant Examiner.*